No. 834,029. PATENTED OCT. 23, 1906.
J. C. SMITH.
CARBURETER.
APPLICATION FILED SEPT. 23, 1905.

2 SHEETS—SHEET 1.

Witnesses.
C. N. Mills,
A. I. Foster

Inventor.
John C. Smith
By Harry De Wallace
Attorney.

THE NORRIS PETERS CO., WASHINGTON, D. C.

No. 834,029. PATENTED OCT. 23, 1906.
J. C. SMITH.
CARBURETER.
APPLICATION FILED SEPT. 23, 1905.

2 SHEETS—SHEET 2.

Witnesses:
C. H. Mills
A. T. Foster

Inventor:
John. C. Smith.
By Harry De Wallace
Attorney.

UNITED STATES PATENT OFFICE.

JOHN C. SMITH, OF GOUVERNEUR, NEW YORK, ASSIGNOR OF ONE-HALF TO WILLIAM E. SMITH, OF GOUVERNEUR, NEW YORK.

CARBURETER.

No. 834,029.　　　　　Specification of Letters Patent.　　　　　Patented Oct. 23, 1906.

Application filed September 23, 1905. Serial No. 279,778.

*To all whom it may concern:*

Be it known that I, JOHN C. SMITH, a citizen of the United States, residing at Gouverneur, in the county of St. Lawrence and State of New York, have invented certain new and useful Improvements in Carbureters, of which the following is a specification.

This invention relates to improvements in carbureters designed for use in evolving or making combustible gas; and the invention relates particularly to an apparatus of the class which is capable of being installed in or about a dwelling-house, store, or other structure for the purpose of generating and supplying therefor carbureted air suitable for illuminating, heating, cooking, or for any other desired use.

The object of the invention is to provide a carbureted air-generating apparatus or plant portions of which are preferably located in the cellar or basement of a building, the other portions thereof being disposed beneath the surface of the earth a short distance from the building, or the entire apparatus may be located in any suitable outbuilding within convenient distance of the main structure where the gas is to be used.

A further object of the invention is to provide a generator by means of which a combustible gas is produced by mixing gasolene or a like volatile hydrocarbon with air in suitable proportions to provide a fluid adapted for lighting, heating, or cooking; and a further object of the invention is to provide an apparatus which is practically automatic in its workings, requiring but little attention or labor to keep it in working order or repair, and which will produce a high quality of gas under a steady even pressure at a relatively small cost as compared with the expensive service provided by the larger public plants.

A practical embodiment of the invention is represented in the accompanying drawings, forming a part of this specification, in which similar characters of reference indicate corresponding parts in all of the views, and in which—

Figure 1:
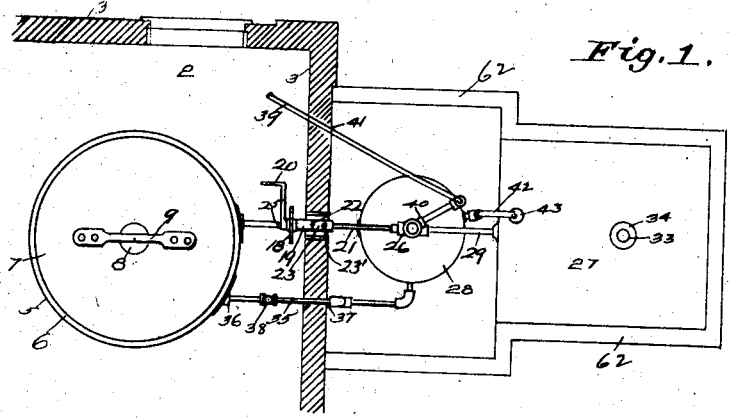
Figure 6:
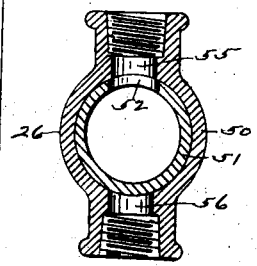
Figure 2:
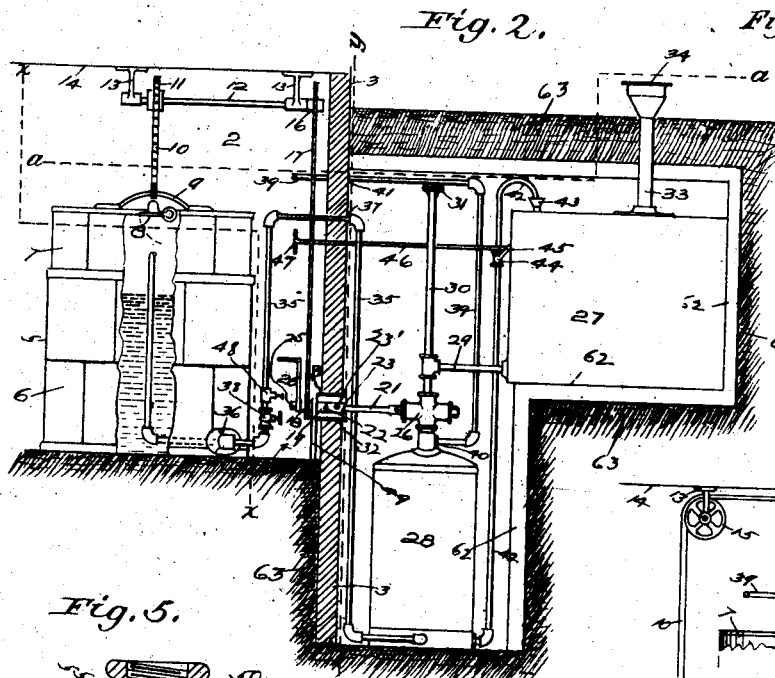
Figure 7:
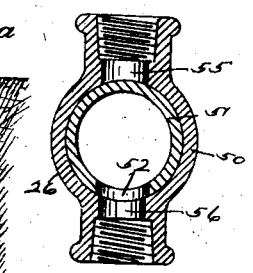
Figure 5:
Figure 12:
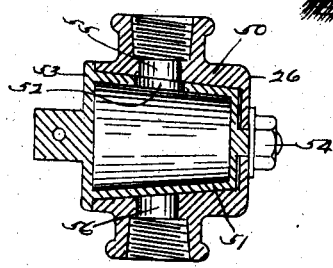
Figure 12:
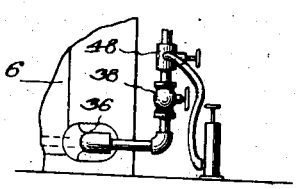
Figure 3:
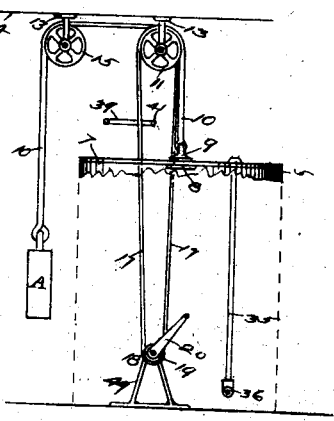
Figure 4:
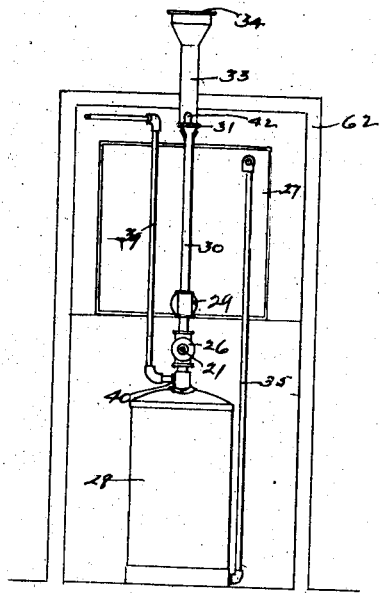
Figure 8:
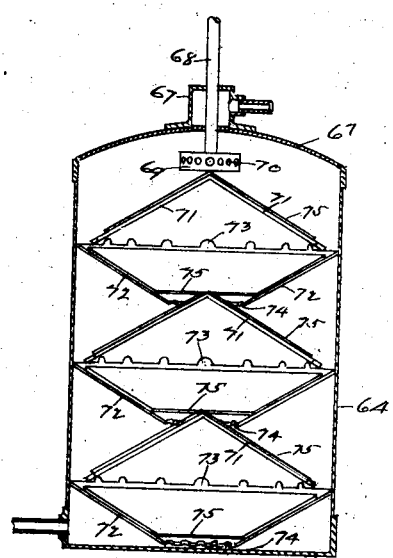
Figure 9:
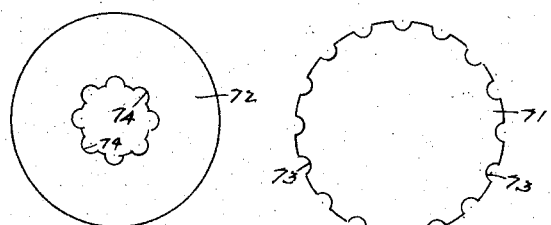
Figure 10:
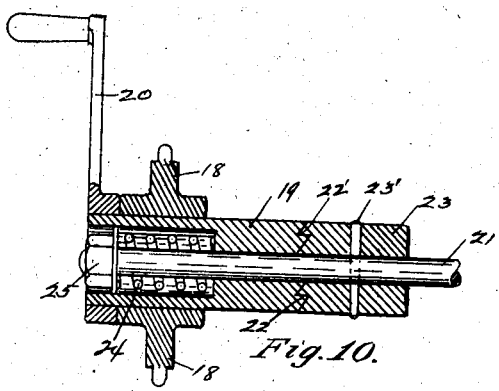
Figure 11:
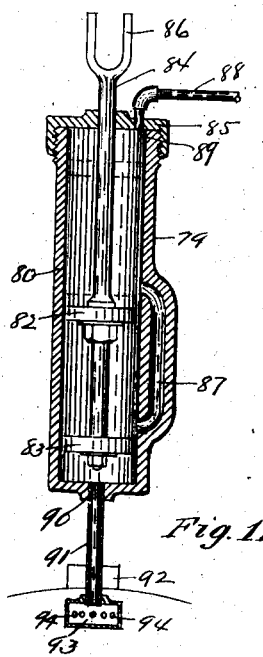

Figure 1 is a plan view of my gas-generator substantially on the line *a a* of Fig. 2, showing the manner of installing the apparatus in reference to a house or like structure. Fig. 2 is a view in elevation, showing practically all of the parts of the generating device and the manner of disposing and connecting them. Fig. 3 is a view of certain of the working parts of the device that are located in the cellar or basement of a building as taken substantially on the line *x x* of Fig. 2. Fig. 4 is a view substantially on the line *y y* of Fig. 2, showing the oil-tank, operating-valve, carbureter, and other related parts, all of which are located outside the walls of the building and beneath the surface of the earth. Fig. 5 is a longitudinal section of the liquid-measuring valve, showing the construction of the same. Fig. 6 is a central cross-section of the measuring-valve, showing the hollow plug or core in position to receive the oil or gasolene as it gravitates from the supply-tank. Fig. 7 is a similar cross-section of the measuring-valve, showing the hollow plug or core in position to empty the gasolene or oil into the carbureter. Fig. 8 is a vertical section of the carbureter, showing the internal construction of the same. Fig. 9 illustrates detail views of the conical shelves of the carbureter. Fig. 10 is a view in longitudinal section of the clutch parts employed in connection with the crank in winding up and setting the aerometer in position. Fig. 11 is a sectional view of a modified form of measuring-valve, showing a double piston instead of the hollow plug illustrated in Fig. 5. Fig. 12 is a detail showing one form of pump connected to valve in air-pipe.

In the drawings, 2 represents a corner of a cellar or basement of a dwelling-house or like structure.

3 is the foundation-walls, and 4 is the cellar or basement floor. 5 is an aerometer or air-tank which is located on said floor inside said walls and is preferably constructed in the manner similar tanks of the class are made for employment in making carbureted air and comprises the cylindrical base 6, having an open top and closed bottom and which is nearly filled with the water 6', and the cylinder 7, which is closed at its upper end, the lower end being open and immersed in the water of part 6. An opening is provided in the top of the part 7 substantially in the center, in which the valve 8 is disposed. This valve is intended to open during the raising of the inverted cylinder 7 for the purpose of admitting air into the tank 5 and then to close and remain in that position to prevent the escape of the air during the travel of said cylinder to its lower position in the part 6. In order to effect the raising of cylinder 7 out of the water the required height for the purpose of filling it with air, I provide the strap 9, which is fastened to the top of cylinder 7, as shown in Figs. 1 and 2, to which is secured the sprocket-chain 10. This chain extends thence upwardly and connects with the sprocket-wheel 11, by means of which it is operated. The wheel 11 is made rigid on the shaft 12, which operates in the hangers or brackets 13, secured to the basement 14. 15 represents a pulley or like part, also secured to the ceiling 14, having its axis disposed parallel with the shaft 12 and its sheave or roller in line with sprocket-wheel 11. This pulley is merely an idler provided to support and carry chain 10 laterally from the center of tank 5 far enough to permit the weight A, attached to the free end of said chain, to travel up and down clear of said tank. The weight A is intended only to be heavy enough to stretch the chain and prevent it from sagging between the wheel 11 and pulley 15. In this manner I provide for the even downward travel of cylinder 7, and therefore obtain a steady flow of air from said tank or meter to other parts of the device.

16 represents a second sprocket-wheel mounted upon the outer end of shaft 12 and rotates with said shaft. This wheel is employed for operating sprocket-chain 17, which extends downwardly to a point near the cellar-floor, where it connects with a small sprocket-wheel 18, which is mounted upon and operates with the clutch member 19. Crank 20 is also rigidly attached to part 19 and is for the purpose of operating the sprockets and chains referred to by hand when it is desired to elevate and fill tank 7 with air. The clutch part 19 is in the form of a sleeve or tube-like part mounted loosely upon shaft 21. The inner end of part 19 is provided with a series of clutch-teeth 22, which are adapted to engage the oppositely-formed teeth 22' of the sleeved part 23, which is secured to the shaft 21 by the pin 23'. It will be seen by reference to the drawings that when the part 19 is rotated by means of crank 20 in the direction to cause the raising of cylinder 7 the teeth 22 and 22' will become disengaged, the former slipping by the latter by reason of a slight longitudinal movement or play allowed to the part 19 on shaft 21, and that when part 19 is operated in the opposite direction, as when rotated by the gravitation or settling of cylinder 7 into the water-filled part 6, said teeth interfit and lock and are held in such position by means of the spring 24, disposed on the outer end of shaft 21, which is held in place by the nut 25 and which exerts its tension against a shoulder formed inside the hollow member 19. This latter feature is provided for the purpose of permitting the winding up of the aerometer without disturbing the valve 26, through which the oil or gasolene is admitted into the carbureter. The valve 26 is connected with the outer end of shaft 21, which extends through the cellar-wall at B, and is intended to be operated by said shaft in but one direction only, as described above. Valve 26 is placed between the oil or gasolene tank 27 and the carbureter 28, the preferred disposition of these parts being as shown in the drawings. The said valve, tank, and carbureter are connected by means of the ordinary pipe-fittings common to apparatus of the class. Feed-pipe 29, which serves as the duct or passage through which the gasolene or oil flows from the supply-tank 27 to valve 26, enters the tank near its bottom, thereby insuring the draining of said tank. This then extends outwardly a short distance and connects with the vertically-disposed pipe 30 just above the valve 26, the latter pipe being connected at its lower end with the casing of valve 26, its upper end extending to a point a short distance above the top of the tank 27. The pipe 30 is employed as a vent to insure the free flow of the oil or liquid from tank 27 into valve 26. The upper end of pipe 30 is provided with a perforated cap or cover 31 for the purpose of emitting or permitting the escape of air and at the same time excluding dirt. The gasolene or oil tank 27 is intended to be of sufficient capacity to hold one or two barrels of the oil, and it is supported in position by suitable curbing or other like means. It is provided on its upper side with the filling tube or part 33, which extends up through the earth, its upper end being formed like a funnel to facilitate pouring the oil into the tank, and the mouth of the funnel is provided with a tight-fitting cap or cover 34 to prevent waste of the liquid by evaporation and also to prevent the admission of foreign substances.

The object of the aerometer is to provide, under a suitable pressure, a supply of air to the carbureter, where it mingles with and assists in the vaporization of the gasolene or other volatile fluid which is employed in making the gas. In order to conduct the air from the aerometer into the carbureter, the pipe 35 is provided. This pipe connects with the bottom of the carbureter and extends thence upwardly on the outside of the basement-wall to a point about on a level of the aerometer, then through said wall at 37 and into the cellar or basement a short distance, thence downwardly to the floor of the cellar, where it enters the aerometer at the point marked "36." After entering the aerometer said pipe is bent upwardly again and extends to a height several inches above the surface of the water in cylinder 6. Under this arrangement the air in cylinder 7 has but one way of escape, and that is through pipe 35, which leads to and connects with the bottom of the carbureter. The valve 38, connected with the air-pipe 35, is provided for shutting off the flow of air from the aerometer to the carbureter whenever such action is required for any purpose.

39 represents a pipe employed to conduct the gas from the carbureter into the building for use in lighting, heating, or cooking. This pipe at its lower end is preferably connected at 40 with the narrow neck of the carbureter. The pipe 39 extends upwardly outside the cellar-wall to a point about on a level with the top of the gasolene-tank 27, thence in a horizontal line into the building, passing through said wall at 41.

42 is an escape or return pipe, the lower end of which is connected with the bottom of the carbureter, the upper end being extended slightly above the top of the oil-tank 27, where it is inserted into a funnel-shaped tube 43, connected to the upper side of the said tank. A valve or cock 44 is disposed in the said pipe 42, which is provided with the handle or lever 45, as shown in Figs. 2 and 4, to which is connected the operating-rod 46. This rod preferably extends horizontally from said valve through the wall of the building, and its inner end is fitted with a T-head 47 for use in operating the rod and said valve 44 by hand from the inside of the cellar. The object of the escape or return pipe 42 is to provide a means of expelling or forcing back into the supply-tank 27 any surplus gasolene or oil which may accumulate in the bottom of the carbureter. In order to force the oil from the carbureter, the person attending the plant will first open valve 44, (which during the operation of the generator is intended to be kept closed,) and close the valve 38, attached to the air-pipe 35, then by means of a bicycle-pump or other form of compressor, as shown in Fig. 12, which may be attached to the small valve 48, also in said pipe 35, a pressure of air may be sent through the overflow-pipe 42 into tank 27. After this has been done valve 44 will be closed and valve 38 opened, so as to permit of the generation of the gas as before.

Shaft 21 where it projects into the basement of the building is supported in the bearing-bracket 49, which is secured to the wall or the floor in any suitable manner.

Valve 26, as fully illustrated in the sectional views Figs. 5, 6, and 7, consists of the casing or shell 50, into which the hollow plug or core 51 is rotatably fitted. The hollow space within said plug is provided with but one opening or vent 52, through which the gasolene or oil flows to fill said space or cavity and through which said liquid flows when it is discharged therefrom. The plug or core 51 is held in position in said casing by means of the flange 53, which is formed on the head of the plug, and also by the nut 54, which is secured to the other end of said plug in the same manner as other like valves are fitted. 55 represents an opening or port in the upper side of the casing 50, through which the oil flows from the tank 27 into said valve-plug, and 56 represents a similar opening or port formed in the lower side of the casing 50, through which the oil flows when emptied from the plug into the carbureter. It is intended in practice to provide a core or plug for valve 26 with a cavity which will hold from three to five cubic inches of liquid, owing to the size of the plant and the quantity of gas consumed in or about a building. The size of said hollow space being fixed, the exact amount of oil or gasolene which is delivered to the carbureter can readily be ascertained, and under this arrangement there is practically no chance of supplying more gasolene to the carbureter than is required to make a given quantity of gas. The valve 26 is intended to be rotated in but one direction during the operation of the generator, and the hollow plug or core will then be filled with the oil from the tank 27 and discharge the same into the carbureter once each revolution of the plug and shaft 21, and by providing the sprockets 16 and 18 in suitable proportions as to diameter and by gaging the descent or gravitation of the compressing-cylinder 7 of the aerometer together with the arrangement of the other working parts, as described, the apparatus is capable of evolving and supplying carbureted air in any desired quantity. The more gas burned or used the faster will be the downward travel of cylinder 7, the more frequent will be the revolutions of the measuring-valve 26, and the greater quantity of gasolene or oil will be delivered by said valve to the carbureter. Under the arrangement and construction as shown and described my generator will accomplish the mixing of the air with the volatile hydrocarbon in substantially the same proportions at all times, and if care be taken at the time of installing and regulating the apparatus or plant to provide for the proper proportions of the several elements which are combined to produce the combustible carbureted air there can thereafter be no appreciable variation in the quality of the product of the machine.

62 represents the curbing which forms the inner lining or walls of the underground compartment in which a portion of the generating system is located. This curbing may be constructed of wood, brick, or any material suitable for holding back the earth from contact with the working parts of the device. The preferred depth at which this part of the plant is placed is about six feet. The shaded border 63 represents the earth.

Fig. 8 of the drawings shows a sectional view of the carbureter 28, in which 64 represents the cylindrical casing, 65 the bottom, and 66 the conical top or head, which is provided with the narrow neck part 67, to which the measuring-valve 26 is connected by means of the tube 68. The gas-pipe 39 is also connected with this neck part in the manner shown. The tube 68, which forms the connection between valve 26 and the neck of the carbureter, extends downwardly inside the conical cap 66 several inches and is fitted on its lower end with the cup-like part 69, which is closed at the bottom and is provided around its upper end with the perforations 70. The object of this cup is to provide a sort of retainer for the gasolene or oil which is discharged from the valve 26. Instead of allowing the oil to fall directly from the discharge-tube 68 into the main part of the carbureter it is caught by this cup, and when the latter becomes filled the gasolene will escape or be discharged through the several perforations 70 and be delivered to the carbureter in a series of small streams or a semispray, thus facilitating the aeration of the oil, which is essential in the generation of the gas. 71 and 72 represent a series of conical shelves which are disposed inside the carbureter in the manner shown in Fig. 8. These shelves are circular in form, as shown in Fig. 9. Shelf 71 comes to a point at its center, which is closed, and is provided around its outer edge with the semicircular openings 73, which are for the purpose of admitting currents of air rising from the bottom of the carbureter. The shelf 72 is also circular in form and has a circular opening at its center, and around the edges of this opening are arranged a series of semicircular openings 74, which are placed there for the same purpose as the openings 73 in shelf 71. The upper surface of each of the shelves 71 and 72, except where the openings 73 and 74 occurs, is overlaid with an absorbent material 75, preferably consisting of a layer of asbestos about one-fourth of an inch in thickness. The object in employing the asbestos is to provide for the partial absorption of the gasolene or oil as it comes from the valve 26 for the purpose of holding it for a considerable time and spreading it over a large surface in order to cause a more perfect evaporation and aeration of the liquid. Without the asbestos or a like substance disposed as shown herein the oil would gravitate very quickly to the bottom of the carbureter, where it would accumulate in considerable quantity, resulting in very slow evaporation, and hence would greatly reduce the quantity and also the quality of the gas generated. Under the construction and arrangement of the interior of the carbureter, as shown herein, very little, if any, of the gasolene or oil will find its way to the bottom of the tank. By reason of the disposition of the semicircular vents 73 and 74 alternating from the sides to the center of the tank the air from the aerometer will pass up through the carbureter in zigzag courses and practically traverse the entire space between the several shelves.

Fig. 11 of the drawings shows a modified form of a measuring-valve 79 intended to perform the same work as the valve 26. This valve is made up of the casing 80, which is cylindrical in form, inside of which the pistons or plungers 82 and 83 are operably disposed and mounted on the piston-rod 84, the upper end of which extends through the head 85 and is provided with the cross-head 86, by means of which it is connected with the parts which operate the valve. 87 represents a duct or passage formed in the side of the casing 80 in the manner shown in the Fig. 11. The gasolene or oil enters the space between the pistons 82 and 83 by flowing through the pipe 88 and the port 89 near the upper end of casing 80 and fills said space while the pistons are in the position shown in full lines in Fig. 11. When the pistons are moved to the position shown by the dotted lines of the same figure, the gasolene or oil will flow through the duct or by-passage 87 into the space below the piston 83 and thence downwardly through port 90 and tube 91 in the neck 92 of the carbureter and is discharged into the cup 93, which is similar in construction and purpose to the cup 67 described above. To get the oil into the carbureter, it must flow through the perforations 94, from which points it will drip down onto the shelves of the carbureter, and after that the oil will be treated in the same manner as in the case heretofore explained.

To operate the gas-generator herein described after the same has been installed ready for use, a barrel or two of gasolene or like oil is placed in the supply-tank 27 and the cylinder 7 of the aerometer is raised to its highest position for the purpose of filling it with a supply of air by means of the crank 20, which operates the several sprocket wheels and chains, as described above. When these acts have been completed, the generator is ready to make and supply the gas to the house or store until the cylinder 7 has again settled down to its lowest position in the water-filled part 6. In common practice where my generator is installed in a dwelling-house or like structure it will only require to be wound up about once a day, and as the supply of oil in the tank will last several days or weeks, owing to the amount of gas consumed, the plant will require little or no attention or care beyond the winding of the aerometer, as described.

Believing that the operation of my gas-generator will be fully understood from the foregoing, further special explanation thereof is regarded as unnecessary.

It will be obvious to any one skilled in the art that various modifications may be made in the device that I have shown and described without departing from the spirit of my invention, and I therefore do not restrict myself to the precise construction herein set forth.

Having thus described my invention, what I claim as new, and desire to secure by Letters Patent, is—

1. In a gas-generator, the combination with an aerometer and an air-supply pipe, of a series of sprocket-wheels and sprocket-chains in operative connection with said aerometer, a gasolene or oil tank, a carbureter, a pipe connecting the tank and carbureter, a valve interposed in the path of said pipe between said tank and said carbureter adapted to control the flow or passage of gasolene or oil from said tank to said carbureter, a shaft connected with said valve, a clutch mechanism mounted on said shaft and operatively connected with said sprocket-wheels and said sprocket-chains to effect the operation of said valve, and also the raising of said aerometer, substantially as described.

2. In a gas-generator, the combination with an aerometer and an air-conducting pipe connected therewith, of a series of chains and sprockets operatively connected with said aerometer, a clutch mechanism connected with and adapted either to operate or to be operated by said chains and sprockets, a shaft upon which said clutch mechanism is mounted, a valve operably connected with said shaft, a gasolene or oil tank, a feed-pipe connecting said tank with said valve, a carbureter connected with said valve and also with said air-conducting pipe, and an escape-pipe adapted to conduct oil or liquid from said carbureter to said oil-tank, substantially as described.

3. In a gas-generator of the class described, comprising an oil-tank, a carbureter, a pipe connecting said tank and carbureter, a valve in the path of said pipe adapted to receive the oil from said tank and to discharge the same into said carbureter in alternating periods or moments, a shaft connected with said valve, a clutch carried by said shaft, an aerometer, a series of sprockets and chains connecting said clutch with the aerometer, a crank connected with one member of said clutch adapted when operated by hand to effect the raising of said aerometer, an air-pipe to conduct a supply of air under pressure from said aerometer to said carbureter, a pipe leading from the carbureter to conduct a supply of combustible gas into a building, and a pipe adapted to conduct the oil from the carbureter back into the oil-tank, substantially as described.

4. In a gas-generator, the combination with the aerometer and an air-conducting pipe connected therewith, of a series of chain and sprocket gears operatively connected with the aerometer and adapted to be operated by hand to effect the raising of said aerometer, a clutch mechanism operatively connected with the aerometer, a shaft upon which said clutch mechanism is mounted, a fluid-measuring valve connected with said shaft adapted to be operated automatically by the gravitation of said aerometer to control the passage of oil from a tank to a carbureter, an oil-tank, a gravity-feed pipe connecting said tank with said valve, a carbureter disposed beneath said valve, a tube forming the passage for the oil from said valve to said carbureter, a perforated cup connecting with said tube, a gas-pipe, and an overflow-pipe, substantially as described.

5. In a gas-generater, the combination with the aerometer and an air-pipe, of a carbureter connected with said air-pipe, a valve disposed above and connected with said carbureter, an oil-tank above said valve, a feed-pipe connecting said tank with said valve, a shaft, a clutch mechanism connected with said shaft, and sprocket-and-chain gearing operatively connected with the aerometer and said valve and adapted for raising or setting said aerometer and also for operating said valve, substantially as described.

In testimony whereof I affix my signature in presence of two witnesses.

JOHN C. SMITH.

Witnesses:
EDGAR O. BLOODLOUGH,
HARRY DE WALLACE.